United States Patent
Franken et al.

(10) Patent No.: US 12,438,218 B2
(45) Date of Patent: Oct. 7, 2025

(54) HOUSING FOR AN ELECTRONIC ELEMENT, PREFERABLY A BATTERY CELL OR A CAPACITOR

(71) Applicant: Wickeder Westfalenstahl GmbH, Wickede (DE)

(72) Inventors: Carina Franken, Arnsberg-Oeventrop (DE); Christian Mücke, Hemer (DE)

(73) Assignee: Wickeder Westfalenstahl GmbH, Wickede (DE)

( * ) Notice: Subject to any disclaimer, the term of this patent is extended or adjusted under 35 U.S.C. 154(b) by 0 days.

(21) Appl. No.: 18/998,136

(22) PCT Filed: Jul. 21, 2023

(86) PCT No.: PCT/EP2023/070274
§ 371 (c)(1),
(2) Date: Jan. 24, 2025

(87) PCT Pub. No.: WO2024/022971
PCT Pub. Date: Feb. 1, 2024

(65) Prior Publication Data
US 2025/0266539 A1    Aug. 21, 2025

(30) Foreign Application Priority Data
Jul. 25, 2022 (DE) .................... 20 2022 104 195.4

(51) Int. Cl.
*H01M 50/128* (2021.01)
*H01G 2/10* (2006.01)
*H01M 50/103* (2021.01)
*H01M 50/107* (2021.01)
(Continued)

(52) U.S. Cl.
CPC ............ *H01M 50/128* (2021.01); *H01G 2/10* (2013.01); *H01M 50/103* (2021.01); *H01M 50/107* (2021.01); *H01M 50/119* (2021.01); *H01M 50/133* (2021.01)

(58) Field of Classification Search
CPC ............ H01M 50/128; H01M 50/107; H01M 50/133; H01M 50/119; H01M 50/103
See application file for complete search history.

(56) References Cited

U.S. PATENT DOCUMENTS
2022/0216548 A1    7/2022    Kobayashi et al.

FOREIGN PATENT DOCUMENTS
EP    0884402 A1    12/1998
JP    H11135079 A    5/1999
(Continued)

OTHER PUBLICATIONS

Applicant's Letter of Response dated Aug. 30, 2024, submitted in Application Serial No. PCT/EP2023/070274 (translation included).
(Continued)

*Primary Examiner* — Jane J Rhee
(74) *Attorney, Agent, or Firm* — The Webb Law Firm

(57) ABSTRACT

The invention relates to a housing for an electronic element, preferably a battery cell or a capacitor, with a cylindrical section and with a base arranged on one side of the cylindrical section. The cylindrical section and the base are formed in one piece. The cylindrical section and the base consist of a clad metal sheet and the metal sheet has at least one layer of aluminium and at least one layer of steel. The housing solves the problem of providing an improved housing.

5 Claims, 1 Drawing Sheet

(51) Int. Cl.
*H01M 50/119* (2021.01)
*H01M 50/133* (2021.01)

(56) References Cited

FOREIGN PATENT DOCUMENTS

| | | |
|---|---|---|
| JP | 2001313008 A | 11/2001 |
| WO | 2010113549 A1 | 10/2010 |

OTHER PUBLICATIONS

Applicant's Letter of Response dated May 6, 2024, submitted in connection with Application Serial No. PCT/EP2023/070274 (translation included).

HOUSING FOR AN ELECTRONIC ELEMENT, PREFERABLY A BATTERY CELL OR A CAPACITOR

CROSS-REFERENCE TO RELATED APPLICATIONS

This application is the United States National Phase of International Patent Application No. PCT/EP2023/070274 filed Jul. 21, 2023, and claims priority to German Patent Application No. 20 2022 104 195.4 filed Jul. 25, 2022, the disclosures of which are hereby incorporated by reference in their entireties.

BACKGROUND OF THE INVENTION

Field of the Invention

The invention relates to a housing for an electronic element, preferably a battery cell or a capacitor, with a cylindrical section and with a base arranged on one side of the cylindrical section, wherein the cylindrical section and the base are formed in one piece wherein cylindrical section and the base consist of a clad metal sheet and wherein the metal sheet has at least one layer of aluminium and at least one layer of steel. In particular, the invention relates to a housing with the features described herein.

Description of Related Art

Such housings are widely used in the electrical industry, especially for the electrification of vehicles battery cell housings, preferably for round cells, are used. The housings can be made of different materials or metals, preferably aluminium or steel, preferably electroplated steel.

Aluminium has an advantage due to its low weight.

Steel, on the other hand, has advantages due to its low production costs and high structural robustness and the associated protection against burnout (so-called "thermal runaway") and against mechanical and pressure loads.

WO 2010/113549 A1 describes a secondary battery made from a metal composite layer by electroplating.

JP 2001 313008 A describes the manufacture of a battery housing from a metal composite layer.

SUMMARY OF THE INVENTION

The present invention is therefore based on the technical problem of further improving the aforementioned housings.

The above technical problem is solved according to a first aspect of the invention in that the metal sheet has a layered structure consisting of two layers of aluminium and a layer of steel arranged between them and the two layers of aluminium each have a layer thickness of 40%+/−10%, in particular +/−5%, of the total thickness of the metal sheet and the layer of steel has a layer thickness of 20%+/−10%, in particular +/−5%, of the total thickness of the metal sheet.

Steel is understood to mean iron and its alloys, which includes all steel grades including Inox.

Furthermore, the aforementioned technical problem is solved according to a second aspect of the invention in that the metal sheet has a layer structure comprising a layer of aluminium, a layer of steel and a layer of nickel or a layer containing zinc, and that the layer of aluminium has a layer thickness of 75%+/−5% or +/−4% of the total thickness of the metal sheet, the layer of steel has a layer thickness of 20%+/−5% or +/−4% of the total thickness of the metal sheet and the layer of nickel or the zinc-containing layer has a layer thickness of 5%+/−5% or +/−4% of the total thickness of the metal sheet.

If the electronic element is designed as a battery cell, the battery cells can have different thicknesses. For example, some so-called pouch cells can be only 50 to 150 μm thick, while other battery cells have dimensions in the range of millimetres or centimetres. This means that the wall thickness of the housing can be adapted to the thickness of the battery cell. In general, housings with thin walls can be used for electronic components with small dimensions.

In a preferred manner, the cylindrical section can be formed with different base shapes as a base, whereby the base can have a round, polygonal prismatic or rectangular shape. The term cylinder is therefore to be understood broadly and is not limited to cylinders with a circular base shape or base area.

According to an embodiment not belonging to the invention, the metal sheet has at least one layer of nickel, with the metal sheet preferably having at least two outer layers of nickel.

Alternatively, according to a further embodiment not belonging to the invention, the metal sheet can have at least one layer of zinc or of a zinc alloy, in particular a lead-free zinc alloy, whereby the metal sheet preferably has at least two outer layers of zinc or of a zinc alloy, in particular a lead-free zinc alloy. Zinc has the advantage that an outer zinc-containing layer can be cold-soldered.

The number of layers of a particular metal and their arrangement within the layer structure can be freely selected.

In the context of this description, plating is understood as a bond by adhesion bonding with atomic diffusion, i.e. a bond between two bonding partners in which a transition layer is formed as a bonding zone by atomic diffusion of the materials of the bonding partners, via which a continuous adaptation of the material properties takes place. The adhesion bond with atomic diffusion is therefore created by the formation of the transition layer between the layers.

In the transition layer, the atoms of the bonding partners are gradually mixed; the formation of a bond takes place through space exchange processes (diffusion) in the transition layer, also known as the bonding zone. This transition layer causes a reduction in internal stresses. The extent of the transition zone depends on the respective bonding partners used, in particular the diffusion properties of the materials involved.

Analyses using various methods can be used to characterise the adhesion bond with atomic diffusion, i.e. the bonding zone of the adhesion bond in the transition layer, and the properties. These methods include optical light microscopy, transmission electron microscopy (TEM), scanning electron microscopy (SEM), energy dispersive X-ray spectroscopy (EDS), secondary ion mass spectrometry (SIMS) and analyses of microhardness curves.

Such a bond or composite is also referred to as a cladding bond or composite. Preferably, the two bonding partners are metallic materials and the cladding composite represents a metallic connection between the two bonding partners or cladding partners. The bonding of the bonding partners in the cladding composite can take place by means of the aforementioned cladding. For this purpose, cladding can be carried out by cold roll cladding or hot cladding.

Alternatively, the bonding partners can also be joined by welding metal packets, in particular diffusion welding or electrofusion welding, or by packeting and partial welding. Furthermore, production by sintering or hot isostatic pressing (HIP) is also possible.

According to the first aspect of the invention the clad metal sheet has a layer structure consisting of two layers of aluminium and a layer of steel arranged in between. The layer of steel is therefore covered on both sides with a layer of aluminium, or the layer of steel is the core layer within the layer structure.

Further preferably, the housing can be designed so that the two layers of aluminium each have a layer thickness of less than 40% of the total thickness of the metal sheet and the layer of steel has a layer thickness of more than 20% of the total thickness of the metal sheet.

According to the second aspect of the invention the clad metal sheet has a layer structure comprising a layer of aluminium, a layer of steel and a layer of nickel or a layer containing zinc. The three layers mentioned follow one another in the specified order, with the steel layer again being the core layer.

Preferably, the layer of aluminium can have a layer thickness of approximately 75% of the total thickness of the metal sheet, the layer of steel a layer thickness of approximately 20% of the total thickness of the metal sheet and the layer of nickel or the layer containing zinc a layer thickness of approximately 5% of the total thickness of the metal sheet. The deviation of the layer thicknesses can vary within limits of +/−5% or +/−4%.

The preferred manufacturing method for all of the housing designs described above is that the one-piece structure of the housing is produced by deep-drawing the metal sheet.

The result of all the preferred designs described above is a housing that combines various desired properties. On the one hand, the use of aluminium results in a low specific weight, and on the other hand, the use of steel within the same housing results in increased structural robustness and corrosion resistance.

The described application of at least one layer of nickel can be advantageous or necessary for joining technology reasons.

BRIEF DESCRIPTION OF THE DRAWINGS

In the following, the invention is explained with reference to the drawing using examples of embodiments. The drawing shows in FIG. 1 a housing made from a metal sheet according to FIG. 2 or FIG. 3

DESCRIPTION OF THE INVENTION

Figure 1:
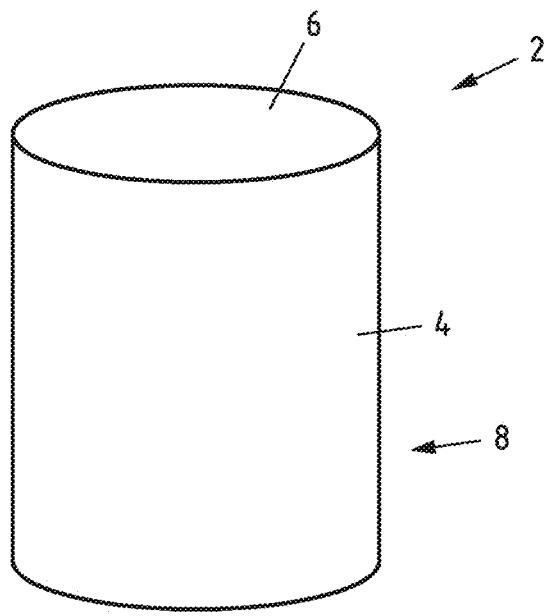

FIG. 1 shows a housing 2 for an electronic element, preferably a battery cell or a capacitor, with a cylindrical section 4 and with a base 6 arranged on one side of the cylindrical section 4. The cylindrical section 4 and the base 6 are formed in one piece and manufactured, for example, by deep-drawing a prefabricated metal sheet.

The cylindrical section 4 and the base 6 consist of a clad metal sheet 8 and the metal sheet 8 has two layers 10 of aluminium and one layer of steel 12. In addition, the metal sheet can also have at least one layer of nickel 14. Two different layer structures are explained below with reference to FIGS. 2 and 3.

Figure 2:
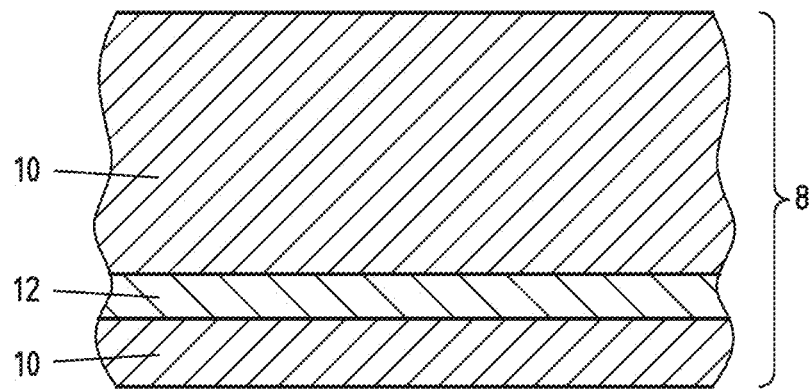
FIG. 2 a first metal sheet according to the invention for producing a housing for an electronic element, preferably a battery cell or a capacitor, and FIG. 3 a second metal sheet according to the invention.

FIG. 2 shows the layer structure of a metal sheet 8 consisting of two layers 10 of aluminium and an intermediate layer 12 of steel. As an example, the two layers 10 of aluminium each have a layer thickness of approximately 40% of the total thickness of the metal sheet 8 and the layer 12 of steel has a layer thickness of approximately 20% of the total thickness of the metal sheet 8.

Figure 3:
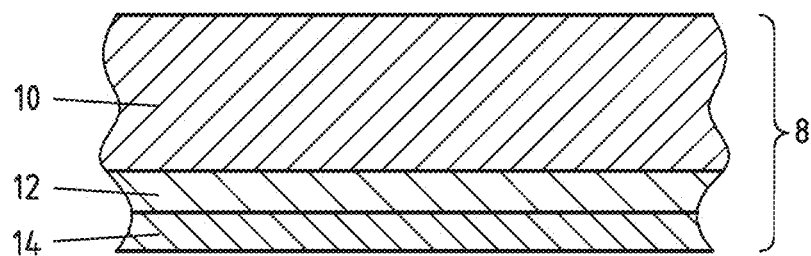

FIG. 3 shows the layer structure of a metal sheet 8 consisting of a layer 10 of aluminium, a layer 12 of steel and a layer 14 of nickel. For example, the aluminium layer 10 has a layer thickness of approximately 75% of the total thickness of the metal sheet 8, the steel layer 12 has a layer thickness of approximately 20% of the total thickness of the metal sheet 8 and the nickel layer 14 has a layer thickness of approximately 5% of the total thickness of the metal sheet 8.

The invention claimed is:

1. A housing for an electronic element, preferably a battery cell or a capacitor,
   with a cylindrical section and
   with a base arranged on one side of the cylindrical section,
   wherein the cylindrical section and the base are formed in one piece,
   wherein the cylindrical section and the base consist of a clad metal sheet and
   wherein the metal sheet has at least one layer of aluminium and at least one layer of steel,
   wherein,
   the metal sheet has a layered structure consisting of two layers of aluminium and a layer of steel arranged between them and
   the two layers of aluminium each have a layer thickness of 40% +/−10%, in particular +/−5%, of the total thickness of the metal sheet and the layer of steel has a layer thickness of 20% +/−10%, in particular +/−5%, of the total thickness of the metal sheet.

2. A housing for an electronic element, preferably a battery cell or a capacitor,
   with a cylindrical section and
   with a base arranged on one side of the cylindrical section,
   wherein the cylindrical section and the base are formed in one piece,
   wherein the cylindrical section and the base consist of a clad metal sheet and
   wherein the metal sheet has at least one layer of aluminium and at least one layer of steel,
   wherein,
   the metal sheet has a layer structure comprising a layer of aluminium, a layer of steel and a layer of nickel or a layer containing zinc, and
   the layer of aluminium has a layer thickness of 75% +/−5% or +/−4% of the total thickness of the metal sheet, the layer of steel has a layer thickness of 20% +/−5% or +/−4% of the total thickness of the metal sheet and the layer of nickel or the zinc-containing layer has a layer thickness of 5% +/−5% or +/−4% of the total thickness of the metal sheet.

3. The housing according to claim 1,
   wherein,
   the base has a round, polygonal prismatic or rectangular shape.

4. The housing according to claim 1,
   wherein,
   the two layers of aluminium each have a layer thickness of less than 40% of the total thickness of the metal sheet and the layer of steel has a layer thickness of more than 20% of the total thickness of the metal sheet.

5. The housing according to claim 1,
   wherein, the one-piece structure is produced by deep-drawing the metal sheet.

* * * * *